Nov. 30, 1971   M. W. GUSTAFSON   3,623,201
RAKE TOOLHOLDER
Filed Sept. 19, 1969

INVENTOR
MANFRED WALLACE GUSTAFSON

BY Bauer & Goodman

ATTORNEYS

United States Patent Office 3,623,201
Patented Nov. 30, 1971

3,623,201
RAKE TOOLHOLDER
Manfred Wallace Gustafson, Fagersta, Sweden, assignor to Fagersta Bruks AB, Fagersta, Sweden
Filed Sept. 19, 1969, Ser. No. 859,273
Claims priority, application Sweden, Sept. 24, 1968, 12,853/68
Int. Cl. B26d 1/00
U.S. Cl. 29—96
3 Claims

ABSTRACT OF THE DISCLOSURE

A toolholder for a rake utilizing a threadably adjusting clamping pin which, during threading into an appropriately slightly inclined threaded opening in the tool holder body, is simultaneously urged by the inclination through a pivoting movement which results in clamping engagement of the pin against the rake and concomitantly results in clamping engagement of an anvil between the rake and the toolholder body.

---

The present invention relates to a rake toolholder device for rake inserts of the type that has two opposed broadsides and two edge sides interconnecting said broadsides and a first opening passing through said broadsides, said rake toolholder comprising a seat for a rake insert, said seat having a supporting surface for one of the broadsides of the rake insert, said supporting surface being possibly formed on a separate anvil, and at least one edge shoulder for one of the edge sides of the rake insert, and a clamp pin adapted for engagement with the wall of the opening in the insert and having a tapped portion threadably engaged with a second opening which is disposed in the holder body and in said possible anvil and tapped along a part of its length, said clamp pin having a portion disposed between said tapped portion and said portion adapted for engagement with the opening wall of the insert, said portion of the clamp pin being adapted to cooperate with said second opening essentially adjacent the side thereof opposite to said edge shoulder in such a way that when the clamp pin is screwed into said second opening, said portion of the clamp pin adapted for engagement with the opening wall of the insert is moved essentially in a direction towards said edge shoulder for clamping said insert in said seat in engagement with said supporting surfaces.

It is previously known to clamp rake inserts with openings passing therethrough by means of differently arranged clamp pins. The structures known heretofore, however, have all included certain defects. Usually, the clamping force obtained has been too small to positively clamp the insert in its seat and/or the clamp pins have made the structural height of the rake toolholder so large as to make the toolholder less useful and versatile.

The object of the present invention is to provide a new and improved rake toolholder which does not include the above mentioned disadvantages. According to the invention, to obtain the above object the proposal is made with a rake toolholder of the kind set forth in the above introductory to form said portion adapted to cooperate with said second opening of a shoulder surface extending generally radially to the longitudinal axis of the clamp pin and facing from said supporting surface, for cooperating with a step provided in said second opening, said step being disposed substantially directly below said supporting surface, there being a gap between the threads of said second opening and the threads of said clamp pin, said gap, when said cooperation of said shoulder with said step of said second opening takes place, enables said clamp pin to be pivoted to a position in which its portion adapted for engagement with the opening wall of said rake insert clamps said insert in said seat.

Given below is a detailed description of two embodiments shown by way of example on the accompanying drawings and revealing additional advantageous features of the invention.

Figure 1:
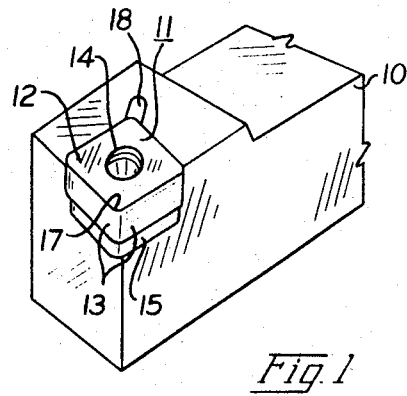
FIG. 1 is a view in perspective of a portion of a first embodiment of the invention.

In FIGS. 1–3, 10 indicates the body of a rake toolholder having a recessed seat for a polygonal or circular rake insert preferably made of hard sintered metal, the rake insert 11 shown here as an example having a square form and being provided with two opposed broadsides 12, four edge sides 13 interconnecting said broadsides and an opening 14 passing through said insert and having a circular or polygonal cross section. The seat has a supporting surface 16 for one of the broadsides 12 of the rake insert, said supporting surface being formed on a separate anvil 15 preferably made of hard sintered metal, and two edge shoulders or rake-clamping surfaces 18 for corresponding edge faces 13 opposite the cutting corner 17 of the insert. At the merging position of the edge shoulders a recess is provided to prevent damaging of the rake insert corner while the insert is being clamped in its seat, said insert corner being aligned with said recess.

Figure 2:
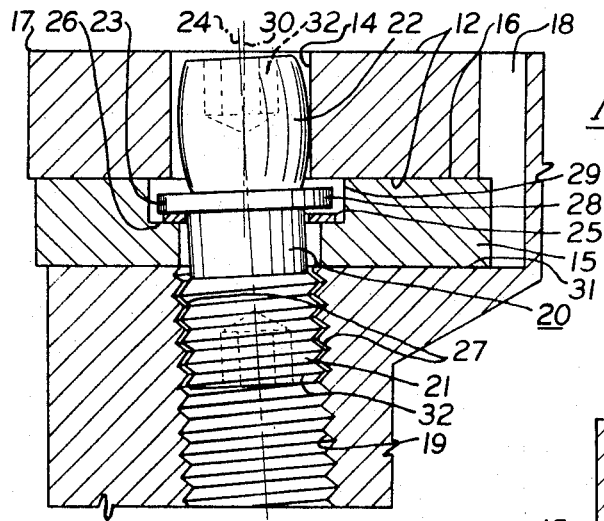
FIG. 2 is a sectional elevation of the front portion of the rake toolholder in FIG. 1, showing the longitudinal axis of the clamp pin being shown in its unclamped position.

An opening 19, a portion of its length being tapped, extends through the holder body 10 and through the anvil 15, a clamp pin 20 being threadably engaged in said opening, said clamp pin having a threaded or tapped portion 21 at one end and a rake-clamping or second portion 22 at the other end, said second portion extending into the opening 14 of the rake insert and adapted to engage the opening wall. The pin 20 has a pivoting flange or shoulder surface 23 disposed between said portions 21 and 22 and extending generally radially to the coinciding longitudinal axis 24 of the pin 20 and the tapped portion of the opening 19, as shown in FIG. 2. The shoulder 23 faces the supporting surfaces 16 and is adapted to present a step 26. Thus when the pin 20 is screwed into the opening, engagement takes place adjacent the side of the opening 19 substantially opposed to the edge shoulders of the seat, either directly or, as shown, via a shim 25, said step being formed generally immediately below the supporting surface 16. Said pin 20, when the screwing is continued after said engagement has been obtained, being tilted or pivoted generally about the position of engagement between the surface 23 and the shim 25 disposed on the step 26, whereby the portion 22 of the pin 20 is moved rightwards, as seen in FIG. 2, and clamps the rake insert 11 in its seat while engaging the supporting surface 16 and the edge shoulders. As indicated at 27 in FIGS. 2 and 3, a gap is provided between the threads of the opening 19 and those of the portion 21, said gap enabling the pin 20 to pivot generally without bending. To allow such pivoting with a relative small gap between the threads of the opening 19 and those of the portion 21, the length of the portion 21 is preferably made less than twice its diameter, and the length of the portion 21 is preferably less than its diameter. By suitable forming of the portion 22 of the pin 20 etxending into the opening of the rake insert, e.g. by forming the portion 22 as shown with a diameter increasing from each of its ends, the position in which the clamping force is applied against the wall of the opening 14 of the rake insert can be disposed quite close to the position of contact between the surface 23 and the shim 25, whereby the resilience of the pin 20 is minimized and a maximum retaining force is obtained.

Figure 3:
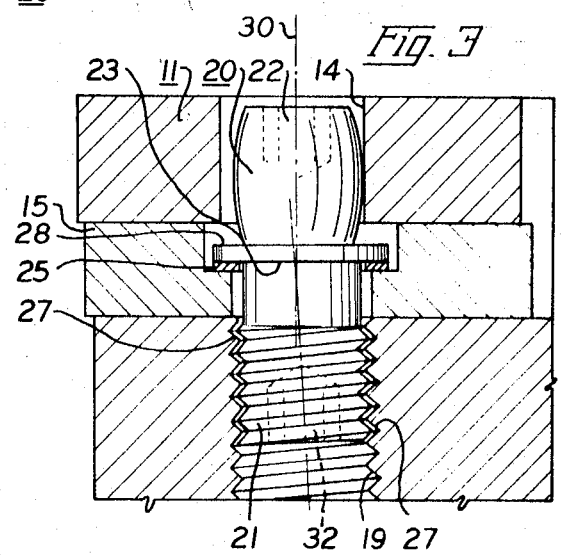
FIG. 3 is a sectional elevation substantially according to FIG. 2, but with said clamp pin being shown in its clamped position.

While the invention is not delimited thereto, the shoulder 23 is preferably formed on an annular collar 23 extending radially from the clamp pin, and the step 26 adapted to cooperate with the shoulder 23 preferably comprises an annular surface faced to the supporting surface 16. As shown in FIGS. 2 and 3, the surface 26 could form the annular bottom of a counterbore or enlarged portion 29 of the opening 19 adjacent the supporting surface 16, the collar 28 being received in the portion 29 and the axis of the annular surface 26, said axis in the shown embodiment being parallel to the axis 30 of the opening 14 but being inclined to the axis 24 of the tapped portion of the opening at an angle so as to engage the shoulder 23 and the step 26 with each other via the shim 25, said engagement generally taking place only on the side remote from the seat rake-clamping surface 18 or, stated differently, on the side diametrically opposed to the area of engagement between the clamp pin and the rake insert.

In the embodiment shown in FIGS. 1–3, the enlarged portion 29 is entirely formed in the anvil 15, whereby the surface 26, in accordance with the principles of the invention, is disposed quite close to the supporting surface 16. Furthermore, the shim 25 disposed between the step 26 and the shoulder 23 could preferably be composed of a spring washer, as shown. Thereby, even when the pin 20 has been unscrewed to an extent causing releasing of the rake insert and enabling the rake insert to be turned or replaced, the anvil 15 will be pressed by the spring washer 25 to engage its supporting surface 31 formed in the holder body 10, so that no impurities could enter between the loose anvil 15 and the holder body. In FIG. 2 the pin 20 is shown in an unscrewed position enabling removing of the rake insert 11 and a gap is provided between the entire tapped portion 21 of the pin 20 and the threads of the opening 19. In FIG. 3 the pin 20 is shown in a position of clamping the rake insert, the pin being pivoted in a clockwise direction, as seen in the figure, whereby the spring washer has been somewhat compressed and no gap exists between the threads of the portion 21 and those of the opening 19 adjacent the upper right and the lower left parts of the portion 21, as seen in FIG. 2. In order to allow easy screwing of the pin 20 into and out of the opening 19, the pin 20 is provided at its upper end face with an opening 32 adapted to receive a suitable wrench.

Figure 4:
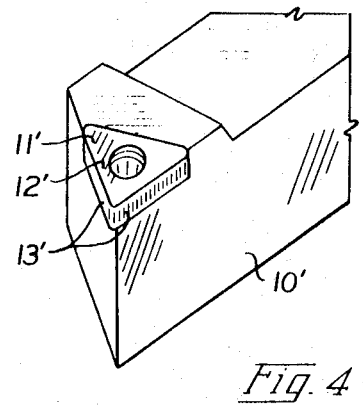
FIG. 4 is a perspective view showing a portion of a second embodiment of the rake toolholder according to the invention.
Figure 5:
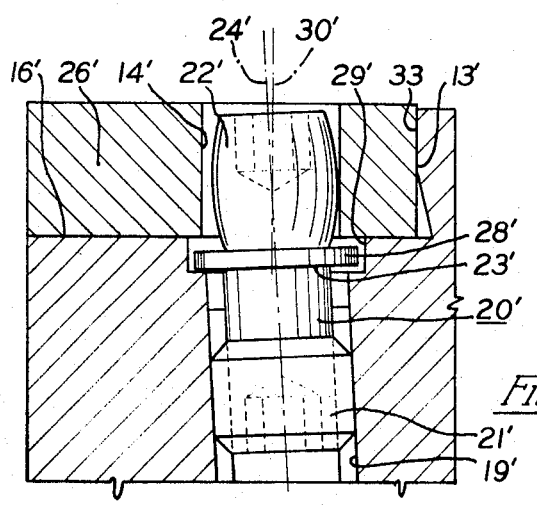
FIG. 5 is a sectional elevation of the front portion of the rake toolholder in FIG. 4 showing the axis of the clamp pin and the cutting corner of the rake insert.

The embodiment of the rake toolholder according to the invention shown in FIGS. 4 and 5 differs from the first embodiment shown in FIGS. 1–3 essentially merely in that the anvil 15 and the spring washer 25 of the first embodiment are dispensed with and in that it is adapted for triangular rake inserts. Thus, the rake toolholder shown in FIGS. 4 and 5 has a holder body designated 10' with a seat for a triangular rake insert 11' having broadsides 12' and edge sides 13' and an opening 14' passing therethrough. The seat has a supporting surface 16' and a single edge shoulder 33 which is formed to engage only the upper part of an edge side 13'. This increases the force holding the rake insert clamped to the supporting surface 16' when the clamp pin is screwed into the opening 19. It is of course within the scope of the invention to form the edge shoulders in a similar manner in the embodiment shown in FIGS. 1–3.

The pin 20' screwed into the lengthwise partially tapped opening 19' corresponds with regard to design and function totally to the pin 20 shown in FIGS. 1–3. Thus, pin 20' has a threaded portion 21', a gap being provided between the threads of the portion 21' and those of the opening 19', and a collar 28' with a lower annular shoulder 23' engaging the annular bottom 26' of the enlarged portion 29' of the opening 19' only at the side disposed essentially diametrically opposed to the position in which the upper portion 22' of the pin 20' engages the wall of the opening 14'. As in the embodiment according to FIGS. 1–3, said engagement between surfaces 23' and 26' is obtained in that the axis 24' of the tapped portion of the opening 19' as shown forms an acute angle to the axis of the annular surface 26', said last mentioned axis being essentially parallel to the axis 30' of the opening 14'.

The invention is not delimited to the embodiments shown in the drawings and described above.

What is claimed is:

1. A rake toolholder comprising a body having a recessed seat formed therein for said rake, said recessed seat being bounded by transversely oriented rake-supporting and rake-clamping surfaces, a support member for said rake having an operative position interposed between said rake and said seat rake-supporting surface, a clamp pin receiving composite opening formed in said support member and in said support surface of said seat, said composite opening including at least two openings oriented relative to each other so that the respective longitudinal axis of each subtends an acute angle, one said opening in said support surface of said seat being a threaded opening slightly angularly inclined in the direction of said rake-clamping surface and said other opening in said support member being an adjacent large diameter opening effective to form a pivoting shoulder at the juncture of said variation in diameters, and a clamp pin formed with an upper clamping section, an intermediate laterally extending pivot flange, and a terminal threaded section, said clamp pin having a starting operative position threadably disposed in said threaded section of said composite opening with a portion of said pivot flange in contact with a portion of said pivot shoulder remote from said rake-clamping surface and the rake positioned between said pin upper clamping section and said seat rake-clamping surface, said clamp pin in response to further threaded adjustment partaking of pivotal movement from said starting operative position towards said rake-clamping surface, whereby said rake is tightly clamped on opposite sides between said pin upper clamping section and said rake-clamping surface and said pivot flange clamps said support member firmly in place against said support surface of said seat.

2. A rake toolholder as defined in claim 1 wherein said rake is generally rectangularly shaped and said rake-clamping surface is formed by two intersecting walls which accommodate a corner of said rake.

3. A rake toolholder as defined in claim 1 wherein said rake is generally triangularly shaped and said rake-clamping surface is formed by a single wall.

References Cited

UNITED STATES PATENTS

| 3,284,874 | 11/1960 | Green et al. | 29—96 |
| 3,310,859 | 3/1967 | Dremond et al. | 29—96 |
| 3,341,920 | 9/1967 | Kehn | 29—96 |
| 3,341,921 | 9/1967 | Weller et al. | 29—96 |
| 3,341,923 | 9/1967 | Kehn | 29—96 |
| 3,526,025 | 9/1970 | Sletten | 29—95.1 |

HARRISON L. HINSON, Primary Examiner